United States Patent
Kobayashi et al.

(10) Patent No.: US 6,413,461 B1
(45) Date of Patent: Jul. 2, 2002

(54) PROCESS FOR PRODUCING MULTILAYER MOLDED ARTICLE

(75) Inventors: Yoshitaka Kobayashi; Nobuhiro Usui, both of Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/305,104

(22) Filed: May 4, 1999

(30) Foreign Application Priority Data

May 8, 1998 (JP) ............................. 10-126018
May 12, 1998 (JP) ............................ 10-128710

(51) Int. Cl.[7] ............... B29C 45/56; B29C 45/80; B29C 71/02
(52) U.S. Cl. .............. 264/257; 264/259; 264/266; 264/328.16; 264/348
(58) Field of Search ............... 264/40.5, 237, 264/257, 259, 328.7, 348, 328.16, 266

(56) References Cited

U.S. PATENT DOCUMENTS

| | | | | |
|---|---|---|---|---|
| 4,164,526 A | * | 8/1979 | Hanning | 264/28 |
| 4,668,460 A | * | 5/1987 | Ongena | 264/255 |
| 4,873,041 A | | 10/1989 | Masui et al. | |
| 5,002,706 A | * | 3/1991 | Yamashita | 264/2.2 |
| 5,044,925 A | * | 9/1991 | Watanabe | 425/542 |
| 5,053,179 A | * | 10/1991 | Masui et al. | 264/257 |
| 5,248,459 A | * | 9/1993 | Fukasawa et al. | 264/40.4 |
| 5,281,376 A | * | 1/1994 | Hara et al. | 264/46.4 |
| 5,308,570 A | * | 5/1994 | Hara et al. | 264/257 |
| 5,417,899 A | * | 5/1995 | Kitamura | 264/40.5 |
| 5,772,932 A | * | 6/1998 | Kamiguchi et al. | 264/40.5 |
| 5,795,510 A | * | 8/1998 | Matsumoto et al. | 264/40.5 |
| 5,795,526 A | * | 8/1998 | Matsumoto et al. | 264/266 |
| 5,902,534 A | * | 5/1999 | Fujishiro et al. | 264/255 |
| 5,972,252 A | * | 10/1999 | Saito et al. | 264/2.2 |
| 5,993,719 A | * | 11/1999 | Abe et al. | 264/257 |

FOREIGN PATENT DOCUMENTS

| | | |
|---|---|---|
| EP | 0 333 198 A2 | 9/1989 |
| EP | 0 480 456 A1 | 4/1992 |
| EP | 0 481 306 A1 | 4/1992 |
| EP | 0 654 336 A1 | 2/1994 |
| JP | 063443632 | 12/1994 |

OTHER PUBLICATIONS

Abstract of JP 10–086164–A (1998).

* cited by examiner

*Primary Examiner*—Jan H. Silbaugh
*Assistant Examiner*—Stefan Staicovici
(74) *Attorney, Agent, or Firm*—Fitch, Even, Tabin & Flannery (57) ABSTRACT

A process for producing a multilayer molded article in which a surface of a thermoplastic resin substrate is partly or entirely laminated with a skin material. In the process, a mold including a pair of a female and a male mold halves is used, the process involves (a) supplying the skin material to a predetermined position between the female and the male mold halves in an open state; (b) supplying a molten thermoplastic resin between the skin material and a molding surface of any one of the female and the male mold halves; (c) clamping the mold after or while supplying the molten thermoplastic resin; (d) carrying out primary cooling of the molten thermoplastic resin in the mold; (e) moving a part or a whole of the mold half, wherein the part or the whole of the mold half has a molding surface contacting the skin material, relative to a surface of the skin material to make a gap between the surface of the skin material and a molding surface of the part or the whole of the mold half; (f) carrying out secondary cooling of the molten thermoplastic resin in the state of keeping the position of the mold halves made in the above (g); and (h) opening the mold halves after solidification of the molten thermoplastic resin and taking the molded article out of the mold.

6 Claims, 4 Drawing Sheets

PROCESS FOR PRODUCING MULTILAYER MOLDED ARTICLE

BACKGROUND OF THE INVENTION

1. Field of the Invention

The present invention relates to a process for producing a multilayer molded article in which a surface of a thermoplastic resin substrate is entirely or partly laminated with a skin material.

2. Description of the Related Art

Multilayer molded articles in which-a skin material is laminated on a surface of a thermoplastic resin substrate have been used in a wide variety of fields such as interior parts of automobiles (for example, door trims and instrument panels), and interior and exterior parts of household electric appliances.

As methods for producing such multilayer molded articles, there have been known a method in which a molded article (substrate) obtained by previously forming a thermoplastic resin into a desired shape by a variety of methods such as injection molding is laminated and stuck with a skin material using adhesives or the like, a method using an injection press method, as disclosed in Japanese Patent Publication Kokoku No. 83058/1993 (JP-B-05-83058), in which a skin material is supplied between a pair of a female and a male mold halves, a molten thermoplastic resin is thereafter supplied, and the skin material is then laminated on the surface of the molten thermoplastic resin in parallel with forming the molten thermoplastic resin into a desired shape by means of clamping the mold halves, and so on.

However, the former method includes complex steps and has problems on human bodies and environment caused by solvents contained in the adhesives. The latter method has an advantage that forming a substrate and laminating a skin material onto the substrate can be carried out simultaneously, but there is a problem that texture of the skin material in the molded article obtained is deteriorated because a molding pressure is applied to the skin material under the same condition as that of the resin portion. Particularly, in a case where a fabric skin material with raising is used as the skin material, the raising falls down due to the pressure in mold clamping and the appearance is seriously deteriorated. In a case where a skin material backed with a foamed layer is used, there is a problem that the foamed layer is crushed by the heat and the molding pressure in the mold clamping, so that a cushion property is deteriorated.

Under these circumstances, the present inventors have studied to develop a process for producing a multilayer molded article wherein the advantage of the injection press molding method that a surface of a substrate can be laminated entirely or partly with a skin material in parallel with forming the substrate is utilized, and even in a case where a fabric skin material with raising or a skin material backed with a foamed layer is used, deterioration in an appearance and in a cushion property caused by falling down of the raising and crush of the foamed layer never occurs. As a result, they have accomplished the present invention.

SUMMARY OF THE INVENTION

In one of its broader aspects, the present invention concerns a process embodiment for the production of a multilayer molded article in which a surface of a thermoplastic resin substrate is partly or entirely laminated with a skin material. This embodiment uses a mold including a pair of female and male mold halves. This process embodiment includes supplying the skin material to a predetermined position between the female and male mold halves while they are in an open state; supplying a molten thermoplastic resin between the skin material and a molding surface of any of the mold halves (male and female), clamping the mold halves together after or while supplying the molten thermoplastic resin, conducting primary cooling of the molten thermoplastic resin in the mold, moving a part or a whole of a mold half, wherein the part or the whole of the mold half has a molding surface contacting the skin material, relative to a surface of the skin material to create a gap between the surface of the skin material and the part or the whole of the molding surface of that mold half; conducting secondary cooling of the molten thermoplastic resin while maintaining the relative position of the male and female mold halves following the just described movement, opening the mold halves after the molten thermoplastic resin has solidified, and thereafter removing the molded article from the mold.

Another process embodiment concerns the production of a multi-layered article in which a surface of a thermoplastic resin substrate is entirely laminated with a skin material. In this process, a mold including a pair of mold halves (a male mold half and a female mold half) involves supplying the skin material to a predetermined position between the female and male mold halves, the mold halves being in an open state relative to one another. A molten thermoplastic resin is supplied between the skin material and a molding surface of any one of the mold halves (the female and male mold halves). The mold halves are clamped together after or while supplying the molten thermoplastic resin. The molten thermoplastic resin in the mold is subjected to a primary cooling treatment. The two mold halves are opened relative to one another to create a gap between the surface of the skin material and the whole of a molding surface of at least one of the mold halves. The molten thermoplastic resin is suspected to a secondary cooling treatment conducted while maintaining the position of the mold halves with the just described gap therebetween. The mold halves are opened after solidification of the molten thermoplastic resin and the molded article is removed from the mold.

The present invention includes yet another process embodiment for the production of a multi-layer molded article in which a surface of a thermoplastic resin substrate is partly laminated with a skin material. This process also uses a mold including a pair of a male and female mold halves. It also includes a part of a mold surface corresponding to a skin material-laminated surface of the molded article which comes into contact with the skin material, being composed of a movable block which can slide forward and backward in a mold opening/closing direction in the mold. This process embodiment includes supplying the skin material to a predetermined position between the female and the male mold halves while they are in an open state. A molten thermoplastic resin is then supplied between the skin material and a molding surface of the mold half having no movable block. The mold halves are clamped together after or while supplying the molten thermoplastic resin. The molten thermoplastic resin in the mold is subjected to a primary cooling. The movable block which contacts the skin material in the mold half is retracted to create a gap between a surface of the skin material and a molding surface of the movable block. The molten thermoplastic resin in the mold is subjected to a secondary cooling while maintaining the relative position of the mold halves with the just described gap. The mold halves are opened after the resin has solidified and the molded article is removed from the mold.

With respect to the process embodiments described, the gap created between the female and male mold halves can be a half or more of the difference in thickness between the unprocessed skin material prior to molding and the skin material being under compression when the mold halves are clamped together after or while supplying the molten resin.

The skin material can, if desired, be a fabric skin material having a raised surface.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

PREFERRED EMBODIMENT OF THE INVENTION

With reference to drawings, the present invention is illustrated below.

It is needless to say that the embodiment given below is examples of the present invention and should not to be construed to limit the present invention thereto.

EXAMPLES

Example 1

The mold to be used in the present invention may be those which is usually employed for the injection-press molding and the like, and is composed of a pair of a male mold half (1) which has a cavity which is to become a shape of a desired product at a time of clamping the mold and a female mold half (2), any one of the mold halves being connected with a press machine and capable of moving upward and downward or from side to side, and the female and the male mold halves being able to open and close.

The following description is concentrated on the examples wherein an upright mold apparatus opens and closes vertically.

In the process of the present invention, first the mold halves are opened to an open state and a skin material (6) is supplied to a predetermined position therebetween. (FIG. 1)

Figure 1:
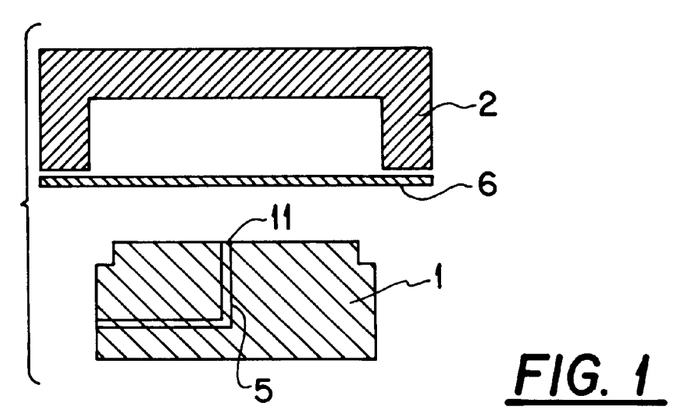
FIG. 1 illustrates a manufacturing process according to the process of the present invention by a schematic cross section of a mold, wherein the mold halves are opened to an open state and a skin material is supplied to a predetermined position therebetween.

The skin material may be, in the instance of using such an upright mold apparatus which opens and closes in the vertical direction and if possible, either placed so as to cover a molding surface of the lower mold half, which corresponds to the male mold in FIG. 1, or fixed by using a skin material-fixing frame or the like mounted between the female and the male mold halves, or fixed onto a parting surface of the female mold half or the like by any appropriate means such as pins. Any method may be chosen for supplying and fixing the skin material.

After supplying the skin material between the female and the male mold halves, a molten thermoplastic resin (7) is supplied between the skin material and a molding surface of one of the female and the male mold halves. (FIG. 2)

Figure 2:
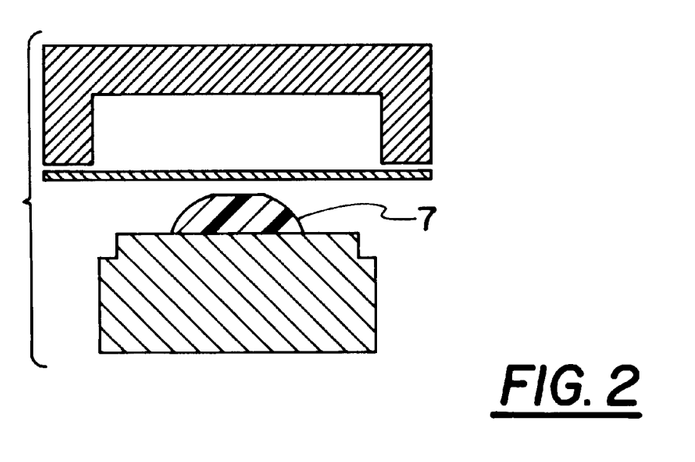
FIG. 2 illustrates a manufacturing process according to the process of the present invention by a schematic cross section of a mold, wherein a molten thermoplastic resin is supplied between the skin material and a molding surface of one of the female and the male mold halves after supplying the skin material between the female and the male mold halves.

The molten thermoplastic resin is supplied between the skin material and the molding surface which is to become the substrate side (in the FIG. 2, the molding surface of the male mold half).

The molten thermoplastic resin (7) may be supplied by an exterior supplying means provided outside the mold, from which the molten thermoplastic resin is supplied onto the molding surface, but a method wherein the molten thermoplastic resin is supplied via a molten resin path (5) provided in the mold half which is to construct the molding surface of the substrate side (in the FIG. 2, the male mold half) is preferred.

In the latter case, one terminal of the molten resin path (5) is connected with a resin-supplying opening (11) which opens to a molding surface and the other terminal is connected with a plasticizing apparatus (not shown) provided outside the mold.

The numbers of the molten resin path (5) and the resin-supplying opening (11) may be either one, or two or more depending upon a shape and a size of the product, and the arrangement thereof are also appropriately determined.

A cavity clearance defined between the female and the male mold halves is appropriately concretely determined in consideration of a type and a thickness of the skin material to be used.

Figure 3:
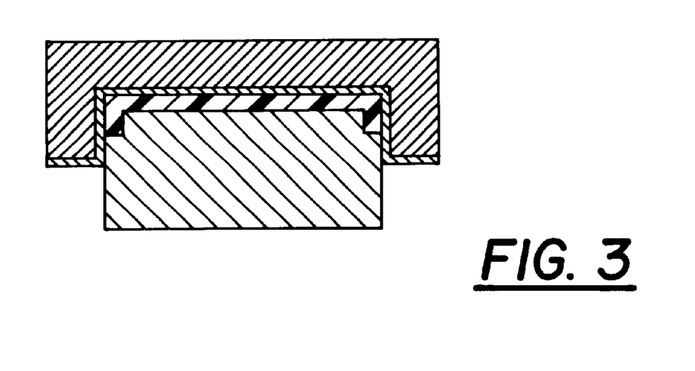
FIG. 3 illustrates a manufacturing process according to the process of the present invention by a schematic cross section of a mold, wherein the mold clamping is carried out by closing the female and the male mold halves.

The mold clamping is then carried out by closing the female and the male mold halves. (FIG. 3)

Such mold clamping may be either commenced after completion of supplying the molten thermoplastic resin or carried out in parallel with the aforementioned step (2), namely, carried out while supplying the molten thermoplastic resin.

In a case where the mold clamping is carried out after the completion of supplying the molten thermoplastic resin, it is preferred that the mold clamping is commenced immediately after the completion of supplying the molten thermoplastic resin.

By the mold clamping, the skin material (6) is laminated on the molten thermoplastic resin layer at the instant that it has come in contact with the molding surface of the female mold half (1).

After the mold clamping, the primary cooling is carried out while retaining the mold clamping state and immediately after that, a part or a whole of the mold half, wherein the part or the whole of the mold half has a molding surface contacting the skin material, is moved relative to the surface of the skin material to make a gap, A, between the surface of the skin material and the molding surface of the part or the whole of a molding surface of the mold half, said gap causing the skin material being under compression by means of the mold clamping in the step (3) to be recovered.

Figure 4:
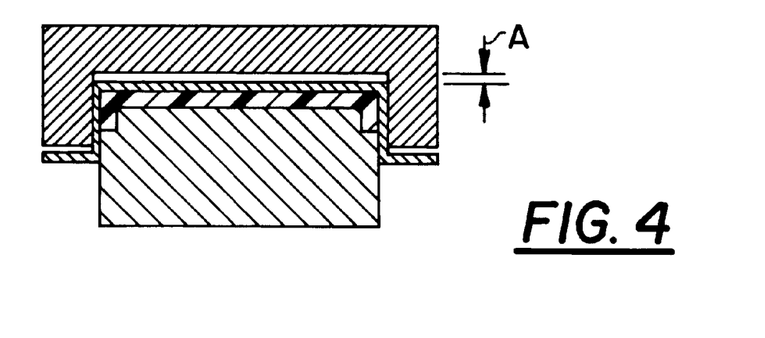
FIG. 4 illustrates a manufacturing process according to the process of the present invention by a schematic cross section of a mold, wherein the female and the male mold halves are slightly opened to make the gap, A, between the surface of the skin material and the whole of the molding surface of the mold half.

More specifically, for example, in a case where the moving element is the whole of the mold half as described above, the female and the male mold halves are slightly opened to make the gap, A, between the surface of the skin material and the whole of the molding surface of the mold half. (FIG. 4) The secondary cooling is thereafter carried out in this state i.e. in the state of keeping the position of the mold halves made in the above Step (5).

Alternatively, in a case where the moving element is the part of the mold as described above, a part of a mold half, the part of the mold half such as a movable block contacting the skin material is retracted into the mold half to make a gap, A, between the surface of the skin material and the part of the molding surface of the mold half [Step (5)], and the secondary cooling is thereafter carried out in this state, i.e. in the sate of keeping the position of the mold halves made in the above Step (5) [Step (6)]. The detail is explained in Example 2.

To carry out the primary cooling, it is essential only that, in the mold clamping state, a surface portion of the molten thermoplastic resin is in a slightly solidified state. The thermoplastic resin layer need not be completely solidified to the center portion in its thickness direction.

An excessively short primary cooling time causes much deformation of products. On the other hand, an excessively long primary cooling time causes much damage to the skin material, and produces falling down of the raising and crush of the foamed layer. The optimum primary cooling time, therefore, is chosen in consideration of a type of the skin material to be used, a thickness of the product, a resin temperature during molding, a mold clamping pressure and the like.

For example, in a case where a polypropylene resin having a resin temperature of 200° C. is used at a mold temperature of 30° C. and a multilayer molded article in which a fabric skin material with raising is laminated on a 2.5 mm thick substrate is produced, the primary cooling time is about 5 to 10 seconds.

The gap, A, created between the surface of the skin material and the part or the whole of the mold half wherein the part or the whole of the mold half has a molding surface contacting the skin material by slightly opening the part or the whole of the mold corresponds to the length by which the part or the whole of the mold has been opened. The purpose of creating the gap, A, is to relieve the skin material being under compression by means of the mold clamping in the step (3) from compression and to recover it sufficiently without any damages. When it is too small, in a case where the skin material has a foamed layer, the foamed layer compressed can not recover sufficiently, and in the case of the fabric skin material with raising, the raising, fallen down by compression can not recover sufficiently. As a result, the appearance of the skin material after molding deteriorates. On the other hand, if the gap, A, is too large, seriously insufficient cooling raises problems of deformation and the like. Therefore, the gap, A, generally falls within a range of from $(t-t_0)/2$ to $(t-t_0)$, where t is the thickness of the unprocessed skin material before molding and $t_0$ is the thickness of the skin material being under compression by means of the mold clamping, and preferably is the difference in thickness between the unprocessed skin material before molding and the skin material being under compression by means of the mold clamping.

The secondary cooling, which is carried out with the part or the whole of the mold slightly opened and with the gap A retained, is continued until the molten thermoplastic resin under compression is completely solidified as in the cases of the usual molding methods.

The skin material compressed by the mold clamping in the step (3) is relieved by the gap A made in the step (5). During the cooling step, in the case of the skin material having the foamed layer, the foamed layer compressed recovers, and in the case of the skin material with raising, the raising fallen down recovers.

Then, in a case where the moving element is the whole of the mold half as aforementioned, after the molten thermoplastic resin has solidified, the mold halves are opened [Step (7)] (FIG. 5), and the multilayer molded article in which the surface of the substrate is entirely laminated with the skin material is taken out. (FIG. 6)

Alternatively, in a case where the moving element is the part of the mold half as aforementioned, after the molten thermoplastic resin has solidified, the mold halves are opened [Step (7)], and the multilayer molded article in which the surface of the substrate is partly laminated with the skin material is taken out.

Figure 7:
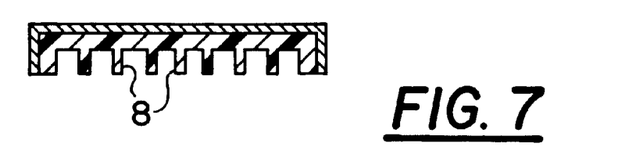
FIG. 7 illustrates an example of a multilayer molded article with a rib obtained by the process of the present invention by a cross section, wherein the deformation is controlled by providing a rib on the rear side of the substrate.

In such a process, a deformation problem of products may occur due to insufficient cooling depending upon a size and a shape of the product, a thickness of the substrate and a type of the skin material to be used, and so on. In such cases, the deformation can be controlled by providing a rib (8) on the rear side of the substrate as shown in FIG. 7 in a case where the moving element is the whole of the mold half as aforementioned or FIG. 15 in a case where the moving element is the part of the mold half as aforementioned.

Example 2

Figure 8:
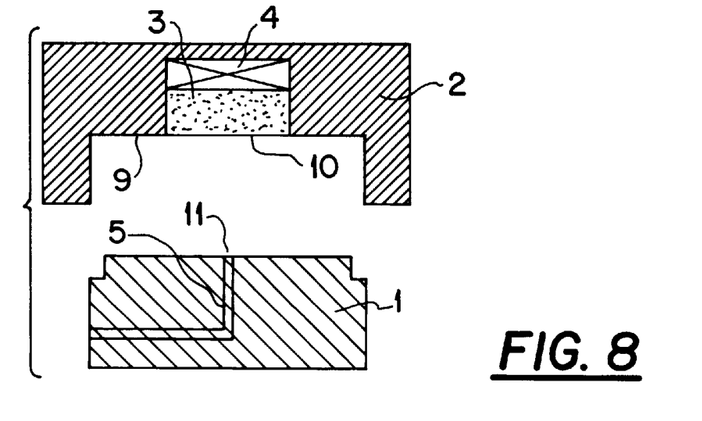
FIG. 8 illustrates an example of a mold to be used in the present invention by a schematic cross section, wherein a movable block is provided to the part of the mold half contacting the skin material and corresponding to the skin material-laminated surface of a product.

FIG. 8 schematically illustrates one example of the mold used in the present invention by means of a cross section.

This mold is composed of a pair of a male mold half (1) and a female mold half (2). In the molding surface of the mold half corresponding to the skin material-laminated surface of a product (the molding surface (9) of the female mold half in the example depicted in the FIG. 8); a movable block (3) is provided to the part of the mold half contacting the skin material.

The movable block (3) has a molding surface (10), whose size is approximately the same as the area of the skin material to be laminated, and is embedded in the mold half located on the skin material side of the product (the female mold half in this example), and has a structure in which the movable block can slide forward and backward in a mold opening/closing direction in the mold by means of a moving means such as a hydraulic cylinder (4).

The movable block (3) usually can, in a state where it has advanced to a limit, make a continuous molding surface by its molding surface (10) together with the molding surface (9) of the female mold half (2) in which the movable block is embedded.

In the other mold half (the male mold half in this example) facing the mold half in which the movable block (3) is embedded is provided a molten resin path (5) for supplying the molten thermoplastic resin into a cavity.

One terminal of the molten resin path is connected with a resin-supplying opening (11) which opens to a molding surface and the other terminal is connected with a plasticizing apparatus (not shown) provided outside the mold.

The number of the resin-supplying opening (11) may be either one, or two or more depending upon a shape and a size of the product, and the arrangement thereof are also appropriately determined. However, at least one resin-supplying opening is preferably provided at a position which faces the molding surface of the movable block (3).

Figure 9:
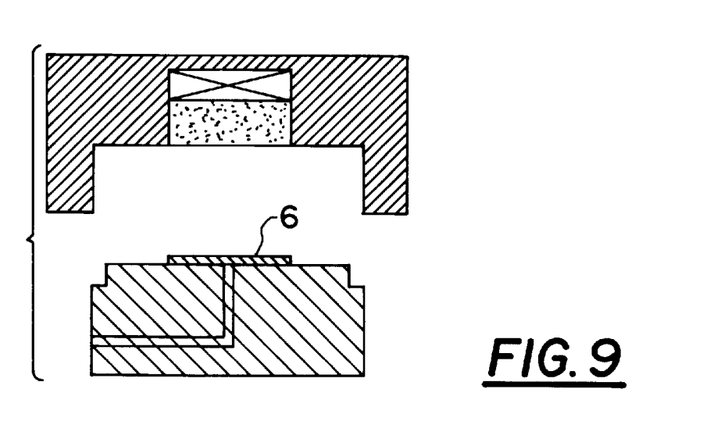
FIG. 9 illustrates a manufacturing process according to the process of the present invention by a schematic cross section of a mold, wherein the mold halves are brought to an open state and a skin material is supplied to a predetermined position therebetween.

In manufacture of the multilayer molded article using the female and the male mold halves, first the mold halves are brought to an open state and a skin material (6) is supplied to a predetermined position therebetween. [Step (1)] (FIG. 9)

At this time, the skin material is supplied to a position facing the molding surface (10) of the movable block (3). FIG. 9 shows a state where the skin material is placed over a position on the male mold half (1), the position facing the molding surface of the movable block (3) provided on the molding surface. At this time, the skin material may be either simply placed on the molding surface of the male mold half or fixed with a fixing means for positioning the skin material.

Alternatively, according to a relation between the female and the male mold halves, a type of the skin material and so on, the skin material may be either placed directly on the molding surface (10) of the movable block (3) or fixed by temporarily fixing the surface side of the skin material onto the molding surface of the movable block using a double-faced tape or the like.

Figure 10:
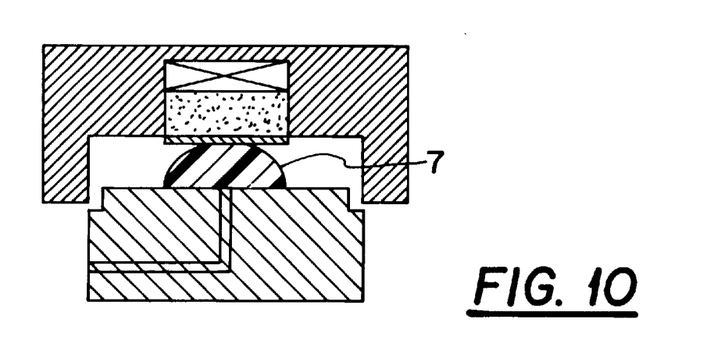
FIG. 10 illustrates a manufacturing process according to the process of the present invention by a schematic cross section of a mold, wherein the molten thermoplastic resin is supplied between the skin material and the molding surface of the mold half having no movable block.

After the step (1), the molten thermoplastic resin (7) is supplied between the skin material and the molding surface of the mold half having no movable block. [Step (2)] (FIG. 10)

A cavity clearance between the female and the male mold halves during this step can concretely be determined in consideration of a type, a thickness and the like of the skin material to be used, but it is essential that the mold halves are in the open state.

In general, before supplying the molten thermoplastic resin, a position of the movable block is adjusted so that the molding surface (11) of the movable block (3) and the molding surface (9) of the female mold half in which the movable block is embedded make a continuous molding surface together.

Figures 11, 12, 13, 14, 15:
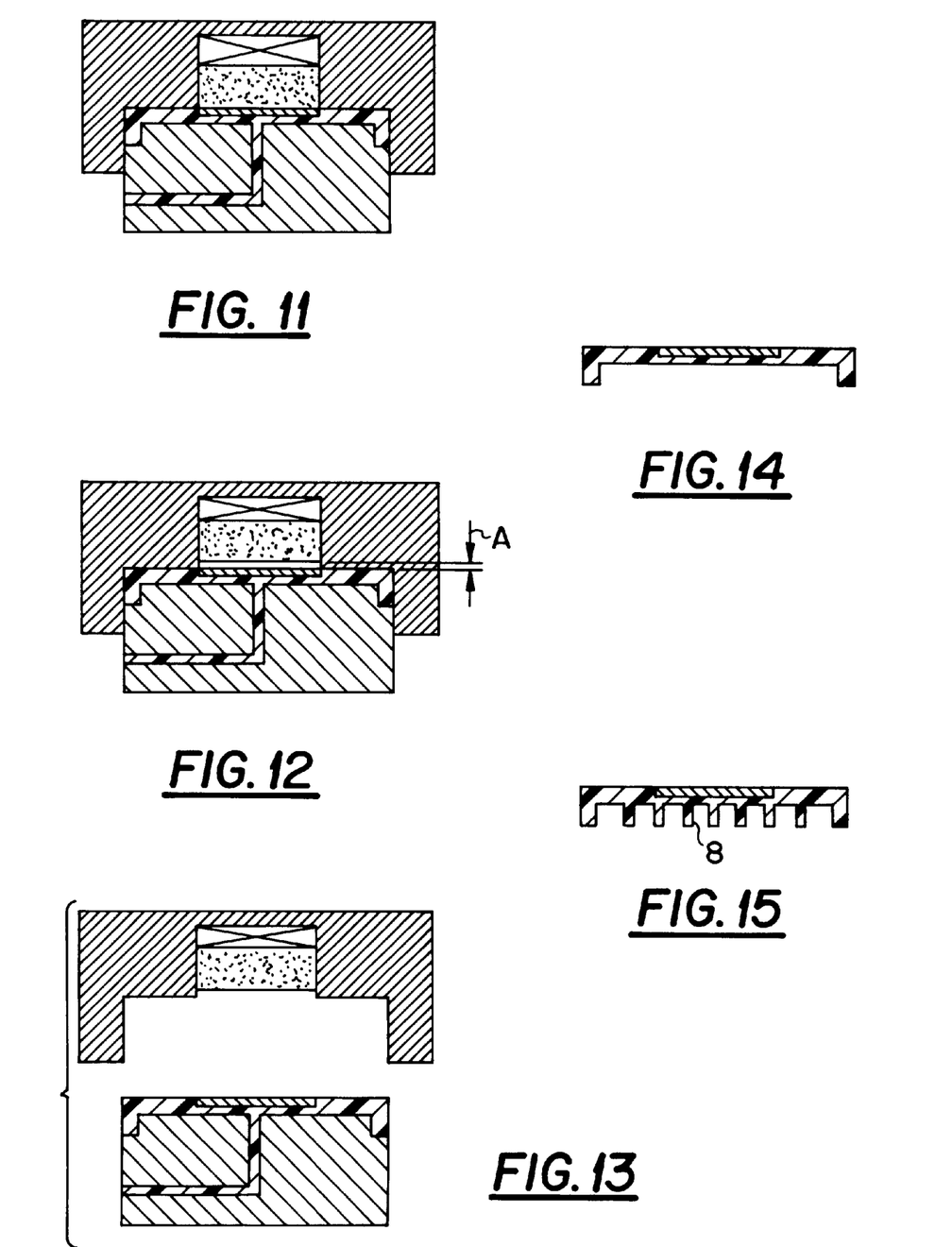
FIG. 11 illustrates a manufacturing process according to the process of the present invention by a schematic cross section of a mold, wherein mold clamping is carried out by closing the female and the male mold halves.
FIG. 12 illustrates a manufacturing process according to the process of the present invention by a schematic cross section of a mold, wherein after the mold clamping, the primary cooling is carried out while retaining the mold clamping state, and immediately after that, the movable block contacting the skin material is retracted into the mold half by means of the hydraulic cylinder to make a gap A between the surface of the skin material and the molding surface of the movable block.
FIG. 13 illustrates an example of a mutlilayer molded article obtained by the process of the present invention by a cross section, wherein the mold halves are opened after the molten thermoplastic resin has solidified.
FIG. 14 illustrates an example of a multilayer molded article obtained by the process of the present invention by a cross section, wherein the multilayer molded article in which the surface of the substrate is partly laminated with the skin material is taken out.
FIG. 15 illustrates an example of a multilayer molded article with a rib obtained by the process of the present invention by a cross section, wherein the deformation is controlled by providing a rib (8) on the rear side of the substrate.

Subsequently, mold clamping is carried out by closing the female and the male mold halves. [Step (3)] (FIG. 11)

The mold clamping may be either commenced after completion of supplying the molten thermoplastic resin or carried out in parallel with the step (2), in other words, while supplying the molten thermoplastic resin.

In a case where the mold clamping is carried out after the completion of supplying the molten thermoplastic resin, it is preferred that the mold clamping is commenced immediately after the completion of supplying the molten thermoplastic resin.

The surface of the skin material (6) is laminated partly on the surface of the molten thermoplastic resin layer, and comes in contact with the movable block (3) simultaneously through the mold clamping.

After the mold clamping, the primary cooling is carried out while retaining the mold clamping state [step (4)], and immediately after that, the movable block (3) contacting the skin material is retracted into the mold half by means of the hydraulic cylinder (4) to make a gap A between the surface of the skin material and the molding surface (10) of the movable block [Step (5)]. As for a portion laminated with no skin material, the secondary cooling is carried out in the state of keeping the position of the mold halves made in the above Step (5), i.e. while retaining the previous mold clamping state. [Step (6)] (FIG. 12)

To carry out the primary cooling which is continued until retracting the movable block into the mold half and making the gap between the surface of the skin material and the molding surface (10) of the movable block, it is essential only that, in the mold clamping state, a surface portion of the molten thermoplastic resin is in a slightly solidified state. The thermoplastic resin need not be completely solidified to the center portion in its thickness direction.

An excessively short primary cooling time causes much deformation of products. On the other hand, an excessively long primary cooling time causes much damage to the skin material, and produces falling down of the raising and crush of the foamed layer. The optimum primary cooling time, therefore, is chosen in consideration of a type of the skin material to be used, a thickness of the product, a resin temperature during molding, a mold clamping pressure and the like.

For example, in a case where a polypropylene resin having a resin temperature of 200° C. is used at a mold temperature of 30° C. and a multilayer molded article in which a fabric skin material with raising is laminated partly on a 2.5 mm thick substrate is produced, the primary cooling time is about 5 to 10 seconds.

As for a retracting stroke of the movable block at a time when the movable block (3) is retracted into the mold half to make the gap A between the surface of the skin material and the molding surface (10) of the movable block, when it is too small, in a case where the skin material has a foamed layer, the foamed layer compressed can not recover sufficiently, and in the case of the fabric skin material with raising, the raising fallen down by compression can not recover sufficiently. As a result, the appearance of the skin material after molding deteriorates. On the other hand, if the retracting stroke of the movable block is too large, insufficient cooling of the skin material-laminated portion of the substrate due to a heat insulation effect of the skin material raises problems of deformation and the like. Therefore, the retracting stroke of the movable block generally falls within a range of from $(t-t_0)/2$ to $(t-t_0)$, where t is a thickness of the unprocessed skin material before molding and t is the thickness of the skin material being under compression by means of the mold clamping.

Figure 5:
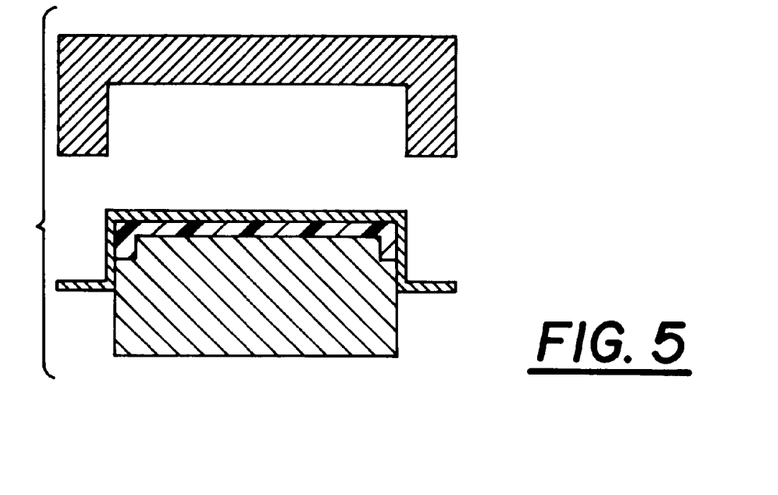
FIG. 5 illustrates a manufacturing process according to the process of the present invention by a schematic cross section of a mold, wherein the mold halves are opened after the molten thermoplastic resin has solidified.
Figure 6:
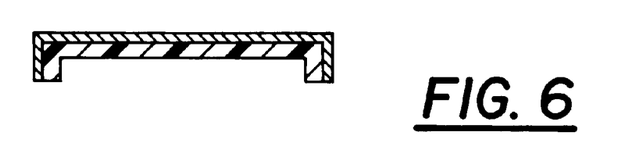
FIG. 6 illustrates an example of a multilayer molded article obtained by the process of the present invention by a cross section, wherein the multilayer molded article in which the surface of the substrate is entirely laminated with the skin material is taken out.

As illustrated in FIG. 5, the term "gap A" means a vertical clearance created by the retraction of the movable block (3) and that is a gap between the surface of the skin material and the molding surface (10) of the movable block (3).

The secondary cooling, which is carried out with the movable block (3) retracted is continued until the molten thermoplastic resin under compression is completely solidified as in the case of the usual molding methods.

After the molten thermoplastic resin has solidified, the mold halves are opened [Step (7)] (FIG. 13), and the multilayer molded article in which the surface of the substrate is partly laminated with the skin material is taken out. (FIG. 14)

In a case where, in such a process, a ratio of the area of the skin material-laminated portion to the entire surface area of the substrate is large, there may arise a difference in cooling degree of the substrate between the skin material-laminated portion and the other portion, because the skin material-laminated portion is insufficiently cooled due to a heat insulation effect of the skin material, and a deformation problem of products may occur. In such cases, the deformation can be controlled by providing a rib (8) on the rear side of the substrate as shown in FIG. 15.

Although examples using the female and the male mold halves having a vertical mold opening/closing direction are mentioned in the above description, a mold opening/closing direction is not essential at all. The aforementioned processes, therefore, can be carried out in the same fashion even if a female and a male mold halves having a horizontal mold opening/closing direction are employed.

As skin materials applicable to the process of the present invention, fabric skin materials are preferred. Especially, woven fabric and knitting fabric with raising such as moquette and tricot, and nonwoven fabric such as a needle punched carpet are preferably employed.

Such skin materials may be used either alone or as a composite skin material in which two or more skin materials are stuck with each other with adhesive or the like. Particularly, fabric skin materials backed with an urethane foamed sheet, a polyolefin-based resin foamed sheet, i.e. a polypropylene foamed sheet, or the like are preferably used.

In addition, composite skin materials in which a sheet or a film of thermoplastic resin or thermoplastic elastomer, paper, metallic foil, a net and the like are backed with the aforementioned foamed sheets are also preferably employed.

As the polyolefin-based resin foamed sheets such as the polypropylene foamed sheet, either those of a crosslinked type or of a non-crosslinked type may be used. An expansion ratio thereof is not particularly limited.

In using such a skin material, it may be subjected to preforming according to a shape of the skin material to be laminated.

As thermoplastic resins applicable to the process of the present invention, those conventionally used in general injection molding, injection compression molding, extrusion molding, stamping molding and the like can be employed with no particularly limitations. For example, conventional thermoplastic resins such as polyolefin resin, i.e. polyethylene and polypropylene, polystyrene, acrylic resin, an acrylonitrile-styrene-butadiene block copolymer, polyamide, i.e. nylon, polyvinyl chloride, polycarbonate and a styrene-butadiene block copolymer, thermoplastic elastomer such as EPM and EPDM, mixtures thereof, and polymer alloys using these materials. These may be either expandable or non-expandable.

The term "thermoplastic resin" used in the present invention includes all of the above exemplified materials.

The thermoplastic resins may contain reinforcing fibers such as glass fiber, fillers including various inorganic and organic fillers such as talc and wollastonite, and the like. Of course a variety of conventionally used pigments, lubricants, antistatic agents, antioxidants, ultraviolet absorbers and the like may be optionally incorporated in the thermoplastic resin.

According to the process of the present invention, the advantage of the injection press molding method that a surface of a thermoplastic resin substrate can be laminated partly or entirely with a skin material in parallel with forming the substrate is utilized, and even in a case where a fabric skin material with raising or a skin material backed with a foamed layer is used, deterioration in an appearance and in a cushion property caused by falling down of the raising and crush of the foamed layer never occurs. Furthermore, a multilayer molded article laminated partly or entirely with a skin material with a good appearance having less distortion can be easily produced.

EXPLANATIONS OF LETTERS OR NUMERALS

1: male mold half
2: female mold half
3: movable block

4: hydraulic cylinder
5: molten resin path
6: skin material
7: molten thermoplastic resin
8: rib
9: molding surface of female mold-half
10: molding surface of movable block
11: resin-supplying opening
A: gap

What is claimed is:

1. A process for producing a multilayer molded article in which a surface of a thermoplastic resin substrate is partly or entirely laminated with a skin material, in which a mold including a pair of a female and a male mold the process comprising:
    (a) supplying the skin material to a predetermined position between the female and the male mold halves in an open state;
    (b) supplying a molten thermoplastic resin between the skin material and a molding surface of any one of the female and the male mold halves;
    (c) clamping the mold after or while supplying the molten thermoplastic resin;
    (d) carrying out primary cooling of the molten thermoplastic resin in the mold;
    (e) moving a part or a whole of the mold half, wherein the part or the whole of the mold half has a molding surface contacting the skin material, relative to a surface of the skin material to make a gap between the surface of the skin material and the part or the whole of a molding surface of the mold half;
    (f) carrying out secondary cooling of the molten thermoplastic resin in the state of keeping the position of the mold halves made in the above (e); and
    (g) opening the mold halves after completion of solidification of the molten thermoplastic resin and taking the molded article out of the mold.

2. A process for producing a multilayer molded article in which a surface of a thermoplastic resin substrate is entirely laminated with a skin material, the process using a mold including a pair of a female and a male mold halves, the process comprising:
    (a) supplying the skin material to a predetermined position between the female and the male mold halves in an open state;
    (b) supplying a molten thermoplastic resin between the skin material and a molding surface of any one of the female and the male mold halves;
    (c) clamping the mold after or while supplying the molten thermoplastic resin;
    (d) carrying out primary cooling of the molten thermoplastic resin in the mold;
    (e) opening the mold halves to make a gap between the surface of the skin material and the whole of a molding surface of the mold half;
    (f) carrying out secondary cooling of the molten thermoplastic resin in the state of keeping the position of the mold halves made in the above (e); and
    (g) opening the mold halves after completion of solidification of the molten thermoplastic resin and taking the molded article out of the mold.

3. A process for producing a multilayer molded article in which a surface of a thermoplastic resin substrate is partly laminated with a skin in which a mold including a pair of a female and male mold halves, is used wherein at least one of said female or male mold halves has a portion of a molding surface that corresponds to a skin material-laminated surface of the molded article, wherein said portion which comes in contact with the skin material comprises a movable block which can slide within said mold in an opening and closing direction, the said process comprising:
    (a) supplying the skin material to a predetermined position between the female and the male mold halves in an open state;
    (b) supplying a molten thermoplastic resin between the skin material and a molding surface of the mold half having no movable block;
    (c) clamping the mold after or while supplying the molten thermoplastic resin;
    (d) carrying out primary cooling of the molten thermoplastic resin in the mold;
    (e) retracting the movable block contacting the skin material into the mold half to make a gap between a surface of the skin material and a molding surface of the movable block;
    (f) carrying out secondary cooling of the molten thermoplastic resin in the state of keeping the position of the mold halves made in the above (e); and
    (g) opening the mold halves after completion of solidification of the molten thermoplastic resin and taking the molded article out of the mold.

4. The process according to claim 1, 2 or 3, wherein in (e) the gap is from at least half of the difference in thickness between the unprocessed skin material before molding and the skin material being under compression by the completion of mold clamping in (c).

5. The process according to claim 1, 2, or 3, wherein the skin material comprises a fabric comprising a raised surface.

6. The process according to claim 1, 2, or 3, wherein in (e) the gap is from at least half up to the difference in thickness between the unprocessed skin material before molding and the skin material being under compression by mold clamping in (c).

* * * * *